(12) United States Patent
Robertson

(10) Patent No.: US 6,188,706 B1
(45) Date of Patent: Feb. 13, 2001

(54) SOLID STATE LASERS

(75) Inventor: John Robertson, Paisley (GB)

(73) Assignee: Barr & Stroud Limited, Glasgow (GB)

( * ) Notice: Under 35 U.S.C. 154(b), the term of this patent shall be extended for 0 days.

(21) Appl. No.: 09/492,472

(22) Filed: Jan. 27, 2000

Related U.S. Application Data

(62) Division of application No. 09/000,199, filed as application No. PCT/GB96/02592 on Oct. 22, 1996, now Pat. No. 6,039,632.

(30) Foreign Application Priority Data

Nov. 9, 1995 (GB) .................................................. 9522925

(51) Int. Cl.[7] ........................................................ H01S 3/00
(52) U.S. Cl. ................................................. 372/33; 372/66
(58) Field of Search ........................................ 372/33, 66

(56) References Cited

U.S. PATENT DOCUMENTS

| | | |
|---|---|---|
| 4,899,347 | 2/1990 | Kuchar et al. . |
| 4,918,703 | 4/1990 | Kukla . |
| 5,084,889 | 1/1992 | Tajima . |

FOREIGN PATENT DOCUMENTS

| | | |
|---|---|---|
| 0 583 944 | 2/1994 | (EP) . |
| 0 652 616 | 5/1995 | (EP) . |
| 2 215 906 | 9/1989 | (GB) . |

OTHER PUBLICATIONS

David C. Brown, Stephen D. Jacobs and Nancy Nee, "Parasitic oscillations, absorption, stored energy densityand heat density in active–mirror and disk amplifiers.", Jan. 15, 1978 Applied Optics, pp. 211–224.*

D.C. Brown, D.P. Benfey, W.J. Gehm, D.H. Holmes, K.K. Lee, "Parasitic oscillations and amplified spontaneous emission in face pumped total internal reflection lasers.", 1987, SPIE vol. 736, pp. 74–83.*

* cited by examiner

Primary Examiner—Teresa M. Arroyo
Assistant Examiner—Gioacchino Inzirillo
(74) Attorney, Agent, or Firm—Alston & Bird LLP

(57) ABSTRACT

A solid state laser has an elongate slab of lasing material having a rectangular cross section with the lower face of the slab contacting a slab mount which is of a high thermal conductivity material. Energy to drive the lasing medium is provided by a flash lamp. Upper and lower faces of the slab are polished to an optically smooth finish so that light is able to propagate in a generally axial direction through the slab. Side faces of the slab are polished and then re-roughened to provide a finish with a surface damage zone comparable in depth to the wavelength of the lasing emission. For a lasing wavelength of one micrometer, the depth of surface damage is in the region of one micrometer.

6 Claims, 2 Drawing Sheets

SOLID STATE LASERS

CROSS-REFERENCE TO RELATED APPLICATIONS

This application is a divisional of U.S. application Ser. No. 09/000,199, filed Jan. 27, 1998 which is a 371 of PCT/GB96/02592 filed Oct. 22, 1996, now U.S. Pat. No. 6,039,632.

The present invention relates to solid state lasers and in particular, though not necessarily, to solid state lasers employing a slab-type lasing medium.

Many conventional solid state lasers employ a cylindrical lasing rod, for example of Nd:YAG, with mirrors placed at opposed ends of the rod Lasing light propagates axially backwards and forwards along the rod causing amplified stimulated emission to occur. A problem with this arrangement is that the optical pump light applied to the rod generates heat which in turn gives rise to temperature gradients across the rod, i.e. transverse to the direction in which light propagates. The temperature gradients cause non-uniformities in the optical properties of the rod to arise, causing distortion and power loss in the light output of the laser. Whilst it is possible to alleviate the steady state problem by various means including use of liquid coolants, the problem of dynamic changes in temperature remains significant with respect to lasing performance.

More recently, rod-type lasing media have been replaced with elongate slabs having a rectangular or square cross-section, in an attempt to further reduce the problems caused by temperature gradients within the lasing media. In a slab-type medium, light propagates lengthwise along the medium in a zig-zag manner, reflecting alternately off the two opposed longer side faces of the slab which are polished smooth to maximise internal reflections. This is illustrated in FIG. 1.

The zig-zagging of the light path effectively averages out the effect of temperature gradients $\Delta T_b$ between the two opposed faces 1,2 from which the light reflects, reducing distortion of the light beam and therefore improving collimation of the laser output beam. To remove heat from the slab it is usually cooled via one or both of the internally reflecting faces 1, 2, e.g. using a liquid coolant.

With slab-type lasing media however, there still remains the problem of temperature gradients $\Delta T_a$ arising across the width of the media, i.e. between the side faces 3, 4 from which the light beam is not reflected.

It is an object of the present invention to overcome or at least mitigate disadvantages of known solid state lasers.

It is a further object of the present invention to reduce heat generation within solid state laser media and to reduce temperature gradients arising therein.

According to a first aspect of the present invention there is provided a method of reducing temperature gradients within an elongate solid state lasing medium, the medium comprising one or more substantially non-reflecting faces for emitting or scattering radiation generated by amplified spontaneous emission (ASE), the method comprising treating said non-reflecting face or faces to reduce the amount of heat generated by radiation passing therethrough.

Where the medium is provided with one or more pre-roughened faces, the or each face may first be polished visually smooth and then reroughened, such that the depth of surface damage at the roughened face is less than that of the original face. Thus, the scatter path at the roughened face is reduced and heat generation, due primarily to pump light, is also consequently reduced. "Roughening" may be taken to include producing a surface finish which scatters incident light. The finish may comprise periodic or random patterning.

Alternatively, faces of the lasing medium through which it is required to emit or scatter parasitic ASE light can be polished visually smooth and coated with a material whose thermal and optical properties are the same or similar to those of the lasing medium, but in which heat dissipation is less than that in the lasing medium. The outer surface of the coating is then roughened to provide a substantially non-reflecting scattering finish. Given the relatively low heat dissipation which occurs within the coating material, even a relatively large scatter path at the outer surface of the coating material will result in a relatively small amount of heat generation compared to that which would occur at a roughened surface of the lasing medium. Where the lasing medium is in the form of a slab, the surface coating may take the form of thin sections of undoped lasing material or dielectric bonded to the polished short faces of the slab. Alternatively the coatings may be deposited using thin film deposition techniques.

The reduced level of heat generation at the periphery of the lasing medium reduces the need for heat sinking or thermal impedance matching to the side faces. In the case of a slab-type medium, this makes it possible to thermally isolate the slab on three side faces with a gas filled or vacuous gap (thereby reducing the affect of external temperature variations) and to provide a heat sink on only one of the beam reflecting faces to permit heat removal.

In contrast to conventional approaches to reducing the effects of temperature gradients within a solid state lasing medium, which generally involve increasing the conductivity of heat within or around the lasing medium, the present invention relies upon reducing the levels of heat generation within the lasing medium itself.

This reduction has been achieved as a result of realising the significant role which the rough surface finish and resulting depth of surface damage (i.e. crystal discontinuity) given to faces of lasing media play in the generation of heat within the media. In order to allow parasitic light generated by amplified spontaneous emission (ASE) to be removed from a lasing medium, side faces of the medium are often ground so as to significantly reduce internal reflection of this light. In the case of slab-type media, the two shorter side faces from which amplified stimulated light is not reflected are provided with this ground finish. Grinding generally results in a rough surface finish and a significant depth of surface damage to the lasing crystal. Whilst the surface roughness may have an rms peak to peak amplitude of around 1 $\mu$m, surface damage may extend into the crystal by up to 20 $\mu$m (many times the wavelength of the lasing light) causing light, particularly pump light, exiting and entering the ground faces to be scattered by multiple bounce reflections. As the light gives up a given amount of energy per unit length of its travel path, a relatively large amount of heat is generated at the ground faces (the pump light contributing the majority of energy given up as heat). The present invention seeks in particular to reduce heat generation by light transmission at rough faces.

According to a second aspect of the present invention there is provided a laser comprising an elongate solid state lasing medium having a plurality of polished faces arranged to support lasing within the medium at a laser wavelength and at least one non-reflecting face arranged to provide for egress of ASE radiation from the lasing medium, wherein said at least one non-reflecting face is provided with a surface finish arranged to minimise heat generation in the vicinity of the non-reflecting face.

In one embodiment of the invention the or each non-reflecting face has a rough surface finish, wherein the depth of surface damage produced is less than 5 µm but greater than 100 nm and more preferably greater than 0.5 µm.

In an alternative embodiment of the present invention, the or each non-reflecting face is provided by a polished face of the lasing medium and a layer of relatively low heat dissipating material covering at least a portion of said polished face, the outer surface of the covering layer having a rough surface finish. The coating layer may comprise undoped lasing material or alternatively may be a dielectric whose optical properties are matched to those of the lasing material. The coating layer may be a thin slice of material bonded, e.g. by diffusion bonding, to the corresponding surface of the lasing medium.

In a first embodiment of the present invention, the lasing medium is a slab-type lasing medium having upper and lower polished faces for supporting lasing and non-reflecting side faces to provide for egress of ASE radiation, the laser comprising an air gap surrounding the lasing medium on the two non-reflecting side faces and on one of the reflecting faces, and a relatively high thermal conductivity material contacting the lasing medium over the other of the reflecting faces. Preferably, the laser comprises a source of pump light adjacent to the reflecting face of the slab which is not in contact with said high conductivity material and means opposed to the non-reflecting side faces for reflecting pump light into the lasing medium whilst absorbing ASE light. Preferably, the source of pump light is surrounded on three sides by reflecting means for directing pump light from the source to the lasing medium. More preferably, said reflecting means and the means for reflecting and absorbing opposed to the non-reflecting sides, comprise beryllia or alumina.

In an alternative embodiment of the invention, the laser may be double-pumped, i.e. with pump sources arranged on two sides of an elongate slab-type lasing medium. A liquid coolant may be contained between the pump sources and the medium.

For a better understanding of the present invention and in order to show how the same may carried into effect, reference will now be made, by way of example, to the accompanying drawings, in which.

Figure 2:
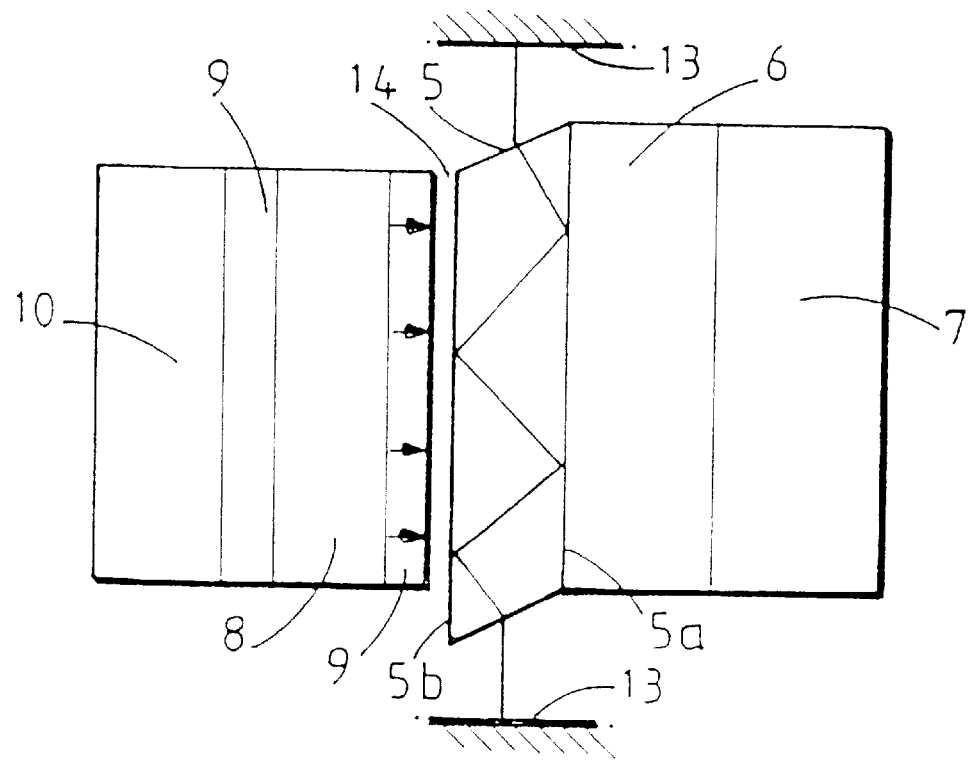
FIG. 2 shows a longitudinal cross-section through a solid state laser employing a slab-type lasing medium.

There will now be described with reference to FIGS. 2 and 3 a solid state laser embodying the present invention. The laser comprises a slab of lasing material 5 which may for example be Nd:YAG. However, it will be appreciated that any other suitable type of material may be used. The slab is elongate having a rectangular cross-section, with the lower face 5a of the slab contacting a slab mount 6 which is of a high thermal conductivity material. A preferred material for the mount 6 is beryllia. The slab mount 6 is in turn mounted on an aluminium base plate 7. Due to different rates of thermal expansion of the slab mount and the base plate materials, the two are kinematically mounted together in a known manner such that they are rigidly fixed to one another whilst still allowing for relative displacement due to thermal expansion.

Energy to drive the lasing medium 5 is provided by a cerium doped quartz flash lamp 8 which is clamped between appropriately contoured sapphire blocks 9. The sapphire blocks 9 conduct heat away from the flash lamp 8 whilst being substantially transparent to the light generated by the flash lamp. The sapphire blocks are bounded on their outwardly facing surfaces by respective blocks of high conductivity material 10, again preferably beryllia which combines high thermal conductivity, electrical isolation, and good diffuse light reflection. The beryllia blocks 10 in turn contact lamp heat sinks 11 which are thermally isolated from the base plate 7.

The sides 7a of the base plate 7 extend upwardly towards the non-reflecting side faces 5c, 5d of the slab 5 and mounted to the sides of the base plate, opposed to the non-reflecting side faces of the slab, are reflector bars 12. Preferably, the reflector bars are coated on their outwardly facing surfaces 12a with a dielectric material providing a wavelength specific reflectivity. Whilst the reflector bars preferentially absorb ASE light which is transmitted by the coating, pump light is reflected back into the lasing medium by the reflective coating.

Figure 1:
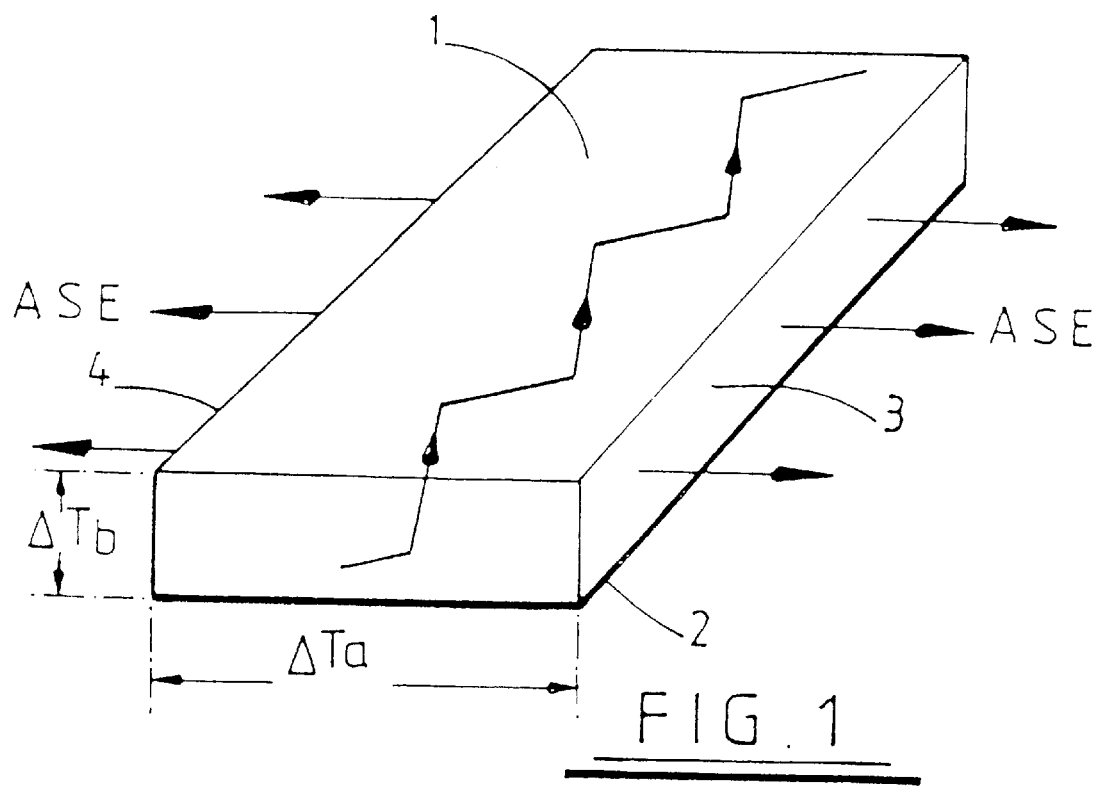
FIG. 1 illustrates beam propagation along a slab-type lasing medium.

The upper and lower faces 5a, 5b of the slab are polished to an optically smooth finish such that light is able to propagate in a generally axial direction through the slab by a reflecting alternately off the top and bottom faces (as illustrated in FIG. 1). In contrast, the side faces 5c, 5d of the slab (FIG. 3) have a finely ground finish such that light is generally not reflected by these faces and is able to exit the slab. By allowing ASE light to leak out through the side faces, the parasitic effect of this light is significantly reduced and energy is allowed to build up in an axial lasing mode. ASE light exiting the side faces 5c, 5d is substantially absorbed by the reflector bars 12 whilst pump light exiting the side faces is reflected back into the slab 5. Mirrors 13 are arranged at respective ends of the slab 5 and redirect light exiting the slab end faces back into the slab.

It is generally the case that slab-type lasing media are provided with a rough surface finish, often resulting from the cutting of the bulk material into slabs. This finish typically results in an rms peak to peak amplitude of 1 µm or more. However, the roughening process produces surface damage, e.g. crystal fractures, down to a depth of 20 µm. As discussed above, this depth of surface damage (sometimes termed the "surface damage zone") results in an unacceptably high level of scattering for light exiting and entering the slab which in turn results in significant amounts of heat being generated at the roughened faces. In order to reduce this problem, pre-roughened faces are first polished to a relatively smooth finish (e.g. <100 nm) and are then reroughened or patterned to provide a finish with a surface damage zone of depth comparable to the wavelength of the lasing emission. Thus, for a lasing wavelength of 1 µm, the depth of the surface damage zone will be in the region of 1 µm. This level of finish is sufficient to substantially prevent internal reflection of light at the roughened or patterned faces 5c, 5d whilst also significantly reducing the level of scattering of light exiting and entering the roughened faces.

Figure 3:
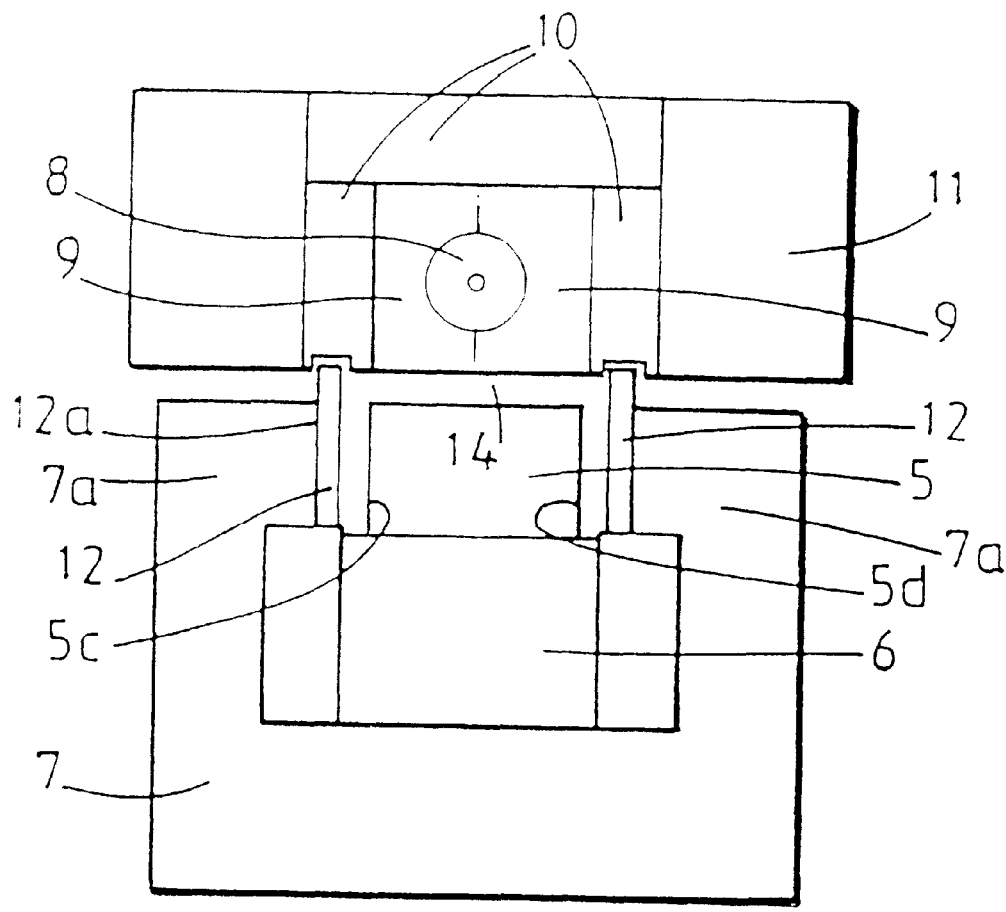
FIG. 3 shows a transverse cross-section through the solid state laser of FIG. 2.

As can be seen from FIG. 3, the slab 5 is surrounded on three sides by an air gap 14 and only makes contact with the slab mount 6 over the surface of the lower face 5a. The air gap is 3 mm or less in width and provides thermal isolation for the slab 5 from the reflector bars 12 and the flash lamp 8, whilst minimising the flow of convection currents. The temperature distribution within the slab 5 is therefore substantially determined by the heat generation processes within the medium and by the slab mount 6. This arrangement achieves a reduction in temperature gradients between the non-reflecting side faces of the slab as compared to conventional arrangements where a multiplicity of factors affect the temperature gradients within the slab.

Figure 4:
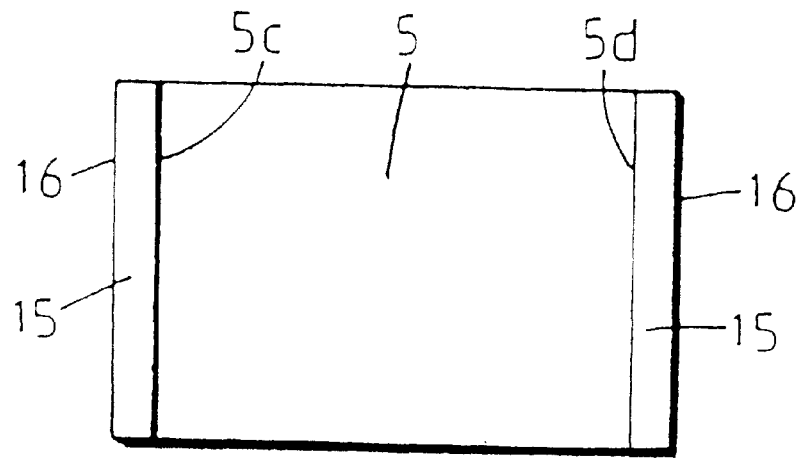
FIG. 4 shows a transverse cross-section through an alternative slab-type lasing medium suitable for use in the laser of FIGS. 2 and 3.

As an alternative to reroughening the side faces 5c, 5d of the slab, it is possible to employ a slab of the type shown in FIG. 4. Following polishing of the side faces 5c, 5d, thin sections 15 of undoped lasing material are diffusion bonded to the side faces of the slab 5. The outer surfaces 14 of the thin sections 15 are provided with a ground finish. As the optical properties of the doped and undoped lasing media are substantially the same, the boundary between the two media has little effect upon light crossing it. However, because the undoped lasing medium possesses a relatively low light absorbtion coefficient, little heat is generated at the outer faces 16 of the thin sections and even a relatively large level of scattering at the outer faces will result in only relatively low levels of heat generation. Again, this facilitates effective removal of ASE light whilst giving rise to little heat generation due to the passage of pump light.

As an alternative to using undoped lasing material to provide a finish for the side faces of the slab, it is possible to use any suitably matched dielectric material. This may be in the form of a thin section bonded to the side faces or may be provided by a thin film deposition process.

It will be appreciated by the skilled person that various modifications may be made to the above described embodiment without departing from the scope of the present invention. It will also be appreciated that the invention is applicable in general to solid state lasers and is not limited to lasers employing slab-type lasing media. For example, the invention can be applied to reduce heat generation in cylindrical rod lasing media.

What is claimed is:

1. A laser comprising an optically-pumped elongate solid state lasing medium in the form of a slab having a rectangular or square cross-section, the slab having two opposed polished faces arranged to support lasing within the medium at a laser wavelength and two opposed non-reflecting faces arranged to provide for egress of ASE radiation from the lasing medium, wherein said non-reflecting faces are provided with a surface finish achieved by polishing and then re-roughening to produce a surface finish which scatters incident light such that the depth of surface damage at the re-roughened faces is less than about five times the lasing wavelength and arranged to minimize heat generation by ASE and pump light radiation in the vicinity of the non-reflecting faces.

2. A laser according to claim 1, wherein the re-roughened surface finish has a depth of surface damage of less than 5 $\mu$m but greater than 100 nm.

3. A laser according to claim 2, wherein the depth of surface damage is greater than 0.5 $\mu$m.

4. A laser comprising an optically-pumped elongate solid state lasing medium in the form of a slab having a rectangular or square cross-section, the slab having two opposed polished faces arranged to support lasing within the medium at a laser wavelength and two opposed non-reflecting faces arranged to provide for egress of ASE radiation from the lasing medium, wherein each non-reflecting face is provided by a polished face of the lasing medium and a covering layer of relatively low heat dissipating material covering said polished face, the outer surface of the covering layer having a rough surface finish and the covering layer having thermal and optical properties which are the same as or similar to those of the lasing medium.

5. A laser according to claim 1 or claim 4, the laser comprising an air gap surrounding the lasing medium on the two non-reflecting side faces and on one of the reflecting faces, and a relatively high thermal conductivity material contacting the lasing medium over the remaining one of the polished faces.

6. A laser as claimed in claim 5, comprising means opposed to the non-reflecting side faces and arranged for reflecting pump light back into the lasing medium while absorbing ASE light.

* * * * *

UNITED STATES PATENT AND TRADEMARK OFFICE
CERTIFICATE OF CORRECTION

PATENT NO. : 6,188,706 B1
DATED : February 13, 2001
INVENTOR(S) : John Robertson It is certified that error appears in the above-identified patent and that said Letters Patent is hereby corrected as shown below:

References Cited, U.S. Patent Document, insert: -- 5,335,237    8/1994 Zapata --.

Signed and Sealed this

Twenty-eighth Day of August, 2001

*Attest:*

*Attesting Officer*

NICHOLAS P. GODICI
*Acting Director of the United States Patent and Trademark Office*